US012190863B2

(12) United States Patent
Quebe et al.

(10) Patent No.: US 12,190,863 B2
(45) Date of Patent: Jan. 7, 2025

(54) SYSTEM AND METHOD FOR AUTOMATED PROCESSING OF DIGITIZED SPEECH USING MACHINE LEARNING

(71) Applicant: CONDUENT BUSINESS SERVICES, LLC, Florham Park, NJ (US)

(72) Inventors: Dennis F. Quebe, Austin, TX (US); Jian Feng, Snoqualmie, WA (US); Ambrish Gupta, Karnataka (IN); Ashwin Subramanyam, Karnataka (IN)

(73) Assignee: Conduent Business Services, LLC, Florham Park, NJ (US)

(*) Notice: Subject to any disclaimer, the term of this patent is extended or adjusted under 35 U.S.C. 154(b) by 283 days.

(21) Appl. No.: 17/750,573

(22) Filed: May 23, 2022

(65) Prior Publication Data

US 2023/0402032 A1    Dec. 14, 2023

(51) Int. Cl.
*G10L 15/08* (2006.01)
*G10L 15/06* (2013.01)
*G10L 15/32* (2013.01)

(52) U.S. Cl.
CPC ............ *G10L 15/063* (2013.01); *G10L 15/08* (2013.01); *G10L 15/32* (2013.01)

(58) Field of Classification Search
None
See application file for complete search history.

(56) References Cited

U.S. PATENT DOCUMENTS 9,208,465 B2    12/2015  Grasso et al.
9,635,177 B1     4/2017  Hoffberg
10,044,867 B2    8/2018  Spottiswoode et al.
10,375,240 B1*   8/2019  Daddi ................ H04M 3/5175
10,601,992 B2*   3/2020  Dwyer ............... H04M 3/5175
10,757,264 B2    8/2020  Kan et al.
11,528,362 B1*  12/2022  Bhat .................. H04M 3/5183
11,893,904 B2*   2/2024  Stoops .................... G09B 5/04
2006/0256953 A1* 11/2006  Pulaski ............... H04M 3/5183
                                                       379/265.06
2014/0322691 A1* 10/2014  Yavari .................... G09B 5/04
                                                       434/321
2018/0091654 A1*  3/2018  Miller ............... H04M 3/42221
2020/0034778 A1*  1/2020  Geary ............. G06Q 10/06398

* cited by examiner

*Primary Examiner* — Jesse S Pullias
(74) *Attorney, Agent, or Firm* — Jones Robb, PLLC

(57) ABSTRACT

Automated systems and methods are provided for processing speech, comprising obtaining a trained machine learning model that has been trained using a cumulative historical data structure corresponding to at least one digitally-encoded speech representation for a plurality of telecommunications interactions conducted by a plurality of agent-side participants, which includes a first data corresponding to a score variable and a second data corresponding to a plurality of driver variables; applying the trained machine learning model: to a subset of data in the cumulative historical data structure that corresponds to a first agent-side participant of the plurality of agent-side participants, to generate a performance classification score and/or a performance direction classification score, to identify an intervention-target agent-side participant from among the plurality of agent-side participants, and to the cumulative historical data structure to identify an intervention training plan; and conducting at least one training session according to the intervention training plan.

20 Claims, 4 Drawing Sheets

SYSTEM AND METHOD FOR AUTOMATED PROCESSING OF DIGITIZED SPEECH USING MACHINE LEARNING

TECHNICAL BACKGROUND

The present disclosure generally describes automated speech processing methods and systems, and in particular aspects describes systems and methods implementing machine learning algorithms to process and/or analyze participant performance and drivers in a telecommunication interaction.

Service (e.g., troubleshooting, feedback acquisition, and so on) is often provided in the form of spoken electronic communication (e.g., telephone, digital voice, video, and so on) between agents and customers or users of a product, business, or organization. Analyzing, understanding, and improving speech in electronic customer interactions is thus important in providing goods and services. This is especially true where goods and services are provided to a large number of customers, as the degree of spoken electronic communication with the customers increases accordingly.

In order to understand how satisfied customers are with a provider's goods, services, and customer interactions, providers often measure customer satisfaction (CSAT) data. In the context of electronic customer service center operations, for example, CSAT measures how satisfied the customers are in their telecommunication interactions with the service center associates. Thus, CSAT is in no small part dependent on the performance and associated speech characteristics of the provider-side participants in telecommunications interactions. CSAT overall may be improved by improving the performance and associated speech characteristics of the service center associates. Because different associates may react differently to the same interventions, it is not necessarily the case that the lowest-performing associates would benefit most from particular interventions; therefore, it is not necessarily the case that that overall satisfaction may be most improved by focusing interventions on the associates deemed to have the lowest performance.

OVERVIEW

Various aspects of the present disclosure provide for automated speech processing systems, devices, and methods which implement machine-learning-based feature extraction and predictive modeling to analyze telecommunication interactions.

In one exemplary aspect of the present disclosure, there is provided a computer-implemented method for processing speech, comprising: obtaining a trained machine learning model, wherein the machine learning model has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables; applying the trained machine learning model to a subset of data in the cumulative historical data structure that corresponds to a first agent-side participant of the plurality of agent-side participants, to generate at least one of a performance classification score or a performance direction classification score; applying the trained machine learning model to identify an intervention-target agent-side participant from among the plurality of agent-side participants; applying the trained machine learning model to the cumulative historical data structure to identify an intervention training plan; and conducting at least one training session for the intervention-target agent-side participant according to the intervention training plan.

In another exemplary aspect of the present disclosure, there is provided a computing system for processing speech, the system comprising: at least one electronic processor; and a non-transitory computer-readable medium storing instructions that, when executed by the at least one electronic processor, cause the at least one electronic processor to perform operations comprising: obtaining a trained machine learning model, wherein the machine learning model has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables; applying the trained machine learning model to a subset of data in the cumulative historical data structure that corresponds to a first agent-side participant of the plurality of agent-side participants, to generate at least one of a performance classification score or a performance direction classification score; applying the trained machine learning model to identify an intervention-target agent-side participant from among the plurality of agent-side participants; applying the trained machine learning model to the cumulative historical data structure to identify an intervention training plan; and facilitating at least one training session for the intervention-target agent-side participant according to the intervention training plan.

In this manner, various aspects of the present disclosure effect improvements in the technical fields of speech signal processing, as well as related fields of voice analysis and recognition, e-commerce, audioconferencing, and/or videoconferencing.

BRIEF DESCRIPTION OF THE DRAWINGS

These and other aspects of the present disclosure are exemplified by the following Detailed Description, which may be read in view of the associated drawings, in which.

DETAILED DESCRIPTION

Figure 1:
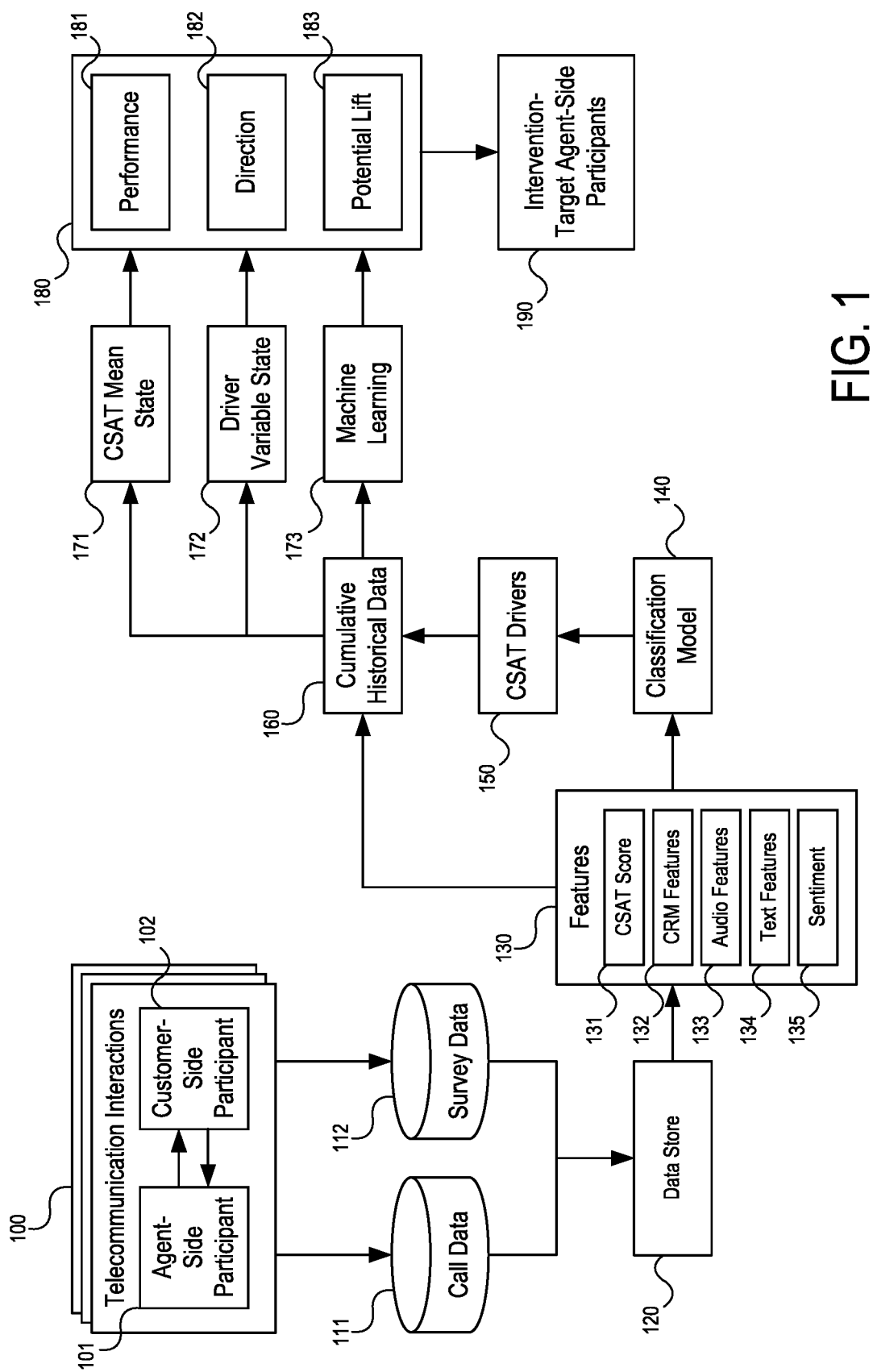
FIG. 1 illustrates an exemplary processing pipeline according to various aspects of the present disclosure.

The present disclosure provides for systems, devices, and methods which may be used to process speech in a variety of settings. While the following detailed description is presented primarily in the context of a customer-service interaction, this presentation is merely done for ease of explanation and the present disclosure is not limited to only such settings. For example, practical implementations of the present disclosure include remote education sessions, such as online classes, foreign language apps, and the like; spoken training programs, such as employee onboarding sessions, diversity training, certification courses, and the like; and so on.

As used herein, an "agent" (also referred to as an "agent-side participant") may be any user- or customer-facing entity capable of conducting or facilitating a spoken conversation. The agent may be or include a human customer service representative, a chatbot, a virtual assistant, a text-to-speech system, a speech-to-text system, or combinations thereof. In several particular examples described herein, the agent is a human customer service representative. A "telecommunication interaction" may include any remote, speech-based interaction between the agent and the customer (also referred to as a "customer-side participant"). An individual telecommunication interaction may be a telephone call, an audioconference, a videoconference, a web-based audio interaction, a web-based video interaction, a multimedia message exchange, or combinations thereof.

As noted above, agent-side participants in telecommunication interactions are a driver of CSAT. To increase CSAT scores, there exists a need for systems, methods, and devices which may identify underperforming agent-side participants and improve their performance through interventions. Such identification and improvement is also important to reduce agent attrition, reduce operational cost of a contact center, reduce computational resource costs, and increase overall CSAT. However, it is not necessarily true that the lowest-performing agents are those that would most benefit from interventions. For example, some agents may underperform due to drivers (i.e., factors which may have an effect on a customer's satisfaction with a call) outside of their direct control, may underperform due to drivers which are more difficult to rectify, and so on.

Thus, the present disclosure provides for systems, methods, and devices which may analyze call-level CSAT data and provide a list of agent-side participants who are suitable candidates for interventions and/or a list of interventions which will most improve the performance of candidate agent-side participants. Such systems, methods, and devices may implement a machine learning algorithm which learns from the CSAT drivers and agent performance historical data and suggests the intervention(s) most likely to improve the performance of under-performing agents.

Various aspects of the present disclosure utilize CSAT drivers which may be produced by a CSAT production model that uses a wide range of features extracted from digitally-encoded telecommunications interactions (e.g., silence ratios from call audio data, key n-gram phrases from call transcripts, consumer relationship management (CRM) data, survey data, and the like). The CSAT prediction model may also use custom deep-learning-based model scores for sentiment analysis and empathy detection as part of an input feature set. Various aspects of the present disclosure may additionally or alternatively utilize cumulative average values of historical telecommunication interaction data for each agent. This input may be similar to agent behavior over time for certain parameters or drivers. Various aspects of the present disclosure may additionally or alternatively generate intervention recommendations and/or plans for under-performing agents.

These and other benefits may be provided by providing systems and/or methods according to the present disclosure. The present disclosure may operate according to a combination of CSAT drivers and agent performance history. When an agent joins an organization, the agent's CSAT and CSAT drivers will tend to fluctuate from call-to-call. Over time, the agent may develop more skills and expertise, and thus subsequently the cumulative average CSAT scores, cumulative average CSAT drivers, and the like may converge to corresponding stable values (also referred to as "converge values"). Each agent will tend to follow a different converge pattern and settle on different converge values. For example, a first agent may converge after 300 telecommunication interactions to a CSAT score converge value of 75%, whereas a second agent may converge after 150 telecommunication interactions to a CSAT score converge value of 85%.

The converge values do not necessarily represent final values for a given agent, and may instead be indicative that the agent has hit a "plateau" in his or her performance. In this manner, it may be possible to perform one or more interventions (e.g., providing additional live or automated training, requiring automated agent surveys before and/or after future telecommunication interactions by the agent, administering tests, etc.) on a given agent to improve his or her performance, for example to a higher converge value. However, when identifying agents as candidates for such interventions, the present disclosure selects those agents who are most likely to benefit from interventions in terms of increase in CSAT rather than simply selecting the lowest performing agents. Moreover, different interventions may be most beneficial for different agents.

Thus, the systems, methods, and devices of the present disclosure implement a system that can suggest a list of agents for an intervention and/or a list of interventions for an agent to thereby achieve improvements in average CSAT. The systems, methods, and devices of the present disclosure may implement a machine learning algorithm that can learn from the cumulative average values of historical telecommunication interaction data of each agent. FIG. 1 illustrates an exemplary pipeline.

As shown in FIG. 1, the pipeline begins with the occurrence of a series of telecommunication interactions 100. Only a small number of telecommunication interactions 100 are shown in FIG. 1, but in practical implementations the total number may be in the thousands, tens of thousands, or higher. Each telecommunication interaction 100 takes place between an agent-side participant 101 and a customer-side participant 102. Each agent-side participant 101 conducts a larger number of individual telecommunication interactions 100 (e.g., hundreds or more), whereas each customer-side participant 102 generally takes part in only a small number of individual telecommunication interactions 100 (e.g., one to three). The telecommunication interactions 100 may be processed to generate digitally-encoded data corresponding to call data 111 and survey data 112, which may be stored in a data store 120.

The call data 111 may include at least one digitally-encoded speech representation corresponding to the series of telecommunication interactions 100, which may include one or both of a voice recording or a transcript or chat log derived from audio of the telecommunication interaction. The voice recording may be provided in the form of audio files in .wav or another audio format and/or may be provided in the form of chat transcripts with separately identifiable agent and caller utterances. The call data 111 may also include a digitally-encoded data set corresponding to metadata about the telecommunication interactions 100, such as a customer relationship management (CRM) data and/or data related to features of the set of telecommunication interactions 100. The features may include call silence ratio (e.g., the time ratio between silence in the call and total call duration), overtalk ratio (e.g., the time ratio between audio in which both participants are simultaneously speaking and total call duration), talk time ratio (e.g., the time ratio between audio in which the agent is speaking and audio in which the caller is speaking), call duration (e.g., the total length of the telecommunication interaction, or one or more partial lengths corresponding to particular topics or sections of the telecommunication interaction), hold count (i.e., the number of times that the agent placed the caller on hold), hold duration, conference count (i.e., the number of times that the agent included another agent or supervisor in the telecommunication interaction), conference duration, transfer count (i.e., the number of times the agent transferred the caller to another agent), and the like.

The survey data 112 may include digitally-encoded data obtained from customer-side participants 102 in one or more of the telecommunication interactions 100. For example, each customer-side participant 102 may be asked to take a brief CSAT survey after each telecommunication interaction 100, and the survey data 112 may include the responses to said CSAT survey. In practice, not all customer-side participants 102 will in fact complete the CSAT survey, so the survey data 112 may additionally or alternatively include predicted CSAT scores to replace any missing data. The predicted CSAT scores may be generated by or using a machine learning algorithm.

The data store 120 may be any storage device, including but not limited to a hard disk, a removable storage medium, a read-only memory (ROM), a random-access memory (RAM), a data tape, and the like. The data store 120 may be part of the same device which performs other operations of the pipeline illustrated in FIG. 1 and/or may be part of a remote device such as a server or external data repository.

A set of features 130 may be retrieved from the data store 120 and made available for further processing. The set of features 130 may include at least one CSAT score 131, at least one CRM feature 132, at least one audio feature 133, at least one text features 134, and at least one sentiment score 135. As noted above, the various features 130 may include call silence ratio, overtalk ratio, talk time ratio, call duration, hold count, hold duration, conference count, conference duration, transfer count, and the like. In instances where one or more features 130 are not directly stored in the data store 120, they may be extracted from data that is present in the data store 120, such as the call data 111. For example, the sentiment score 135 and/or emotion-related features may be calculated using a deep learning architecture.

The extracted features 130 may be input to a classification model 140 which operates to identify which variables are to be used as part of the later machine learning algorithm. The classification model 140 may be trained on at least the CRM features 132, the audio features 133, and the sentiment score 135. In some implementations, the classification model 140 is a fully independent machine learning model. The classification model 140 categorizes the input variables into non-driver features (that is, features that have little or no impact on CSAT score or which are difficult to affect via the interventions) and into CSAT drivers 150 (that is, features which impact CSAT score).

Figure 2:
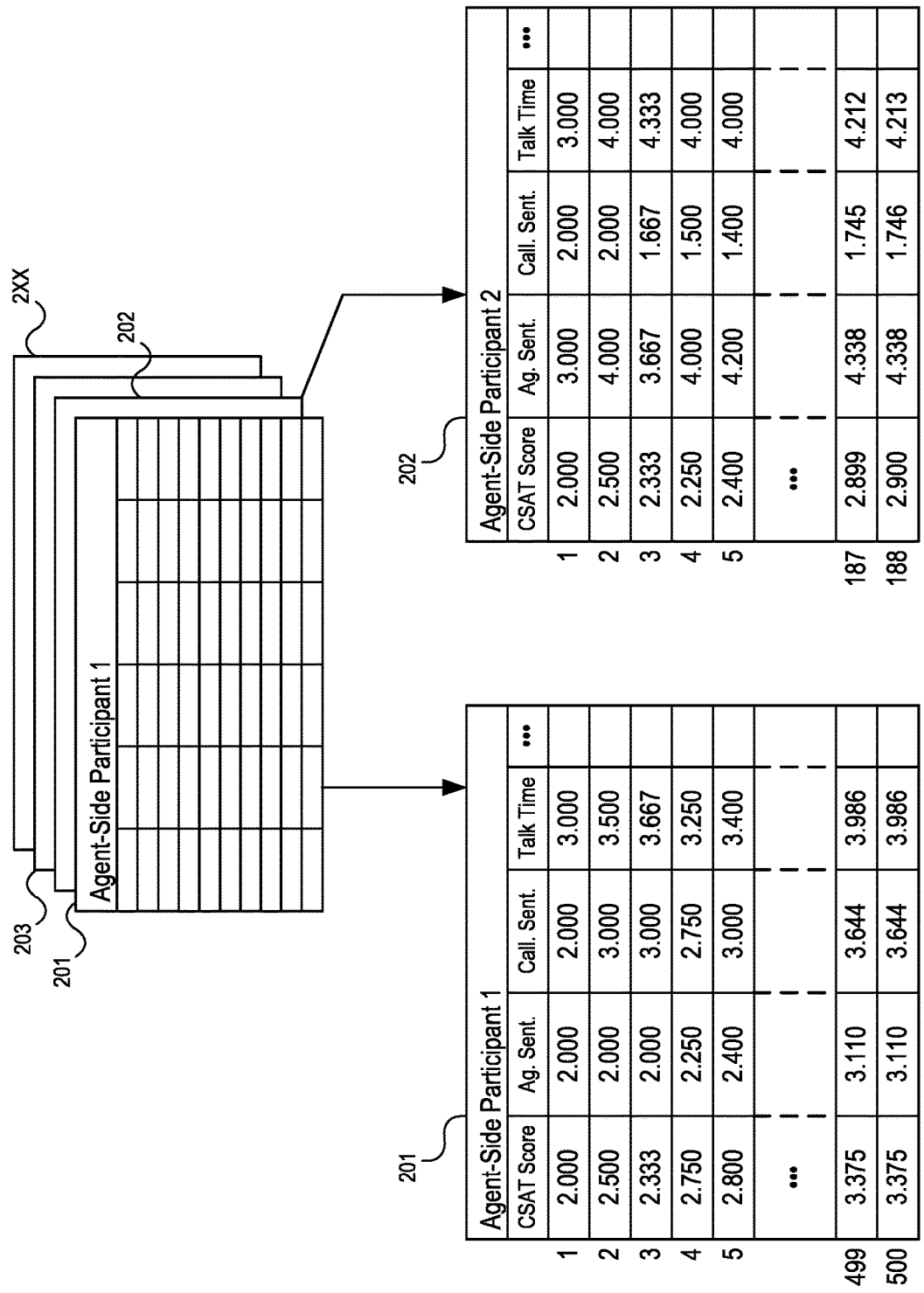
FIG. 2 illustrates an exemplary cumulative historical data structure according to various aspects of the present disclosure.

The identified CSAT drivers 150 and the extracted features 130 used to generate a cumulative historical data 160. The cumulative historical data 160 may include a separate data structure for each of the agent-side participants 101. Each data structure includes cumulative average values of historical data for the CSAT score and all CSAT drivers for the corresponding agent-side participant 101. FIG. 2 illustrates an exemplary subset of the cumulative historical data 160.

As shown in FIG. 2, the cumulative historical data 160 includes a series of individualized data structures 201, 202, 203, . . . , 2XX. Generally, the number of individualized data structures may be the same as the number of agent-side participants 101, although in some implementations the agent-side participant data may be filtered (for example, to remove data corresponding to agent-side participants 101 who have since changed employment). Each individualized data structure is represented as a two-dimensional data array in which the first column corresponds to the cumulative CSAT score (and therefore it is also referred to as a "score column") and the remaining columns each correspond to identified CSAT drivers (and therefore they are also referred to as "driver columns"). Although only three CSAT drivers are particularly illustrated in FIG. 2, in practical implementations each individualized data structure may have columns corresponding to any number of CSAT drivers. Each individualized data structure includes N rows, where N corresponds to the number of telecommunication interactions in which the agent-side participant 101 has participated. Thus, each individualized data structure may have a different value for N. At each cell j, the cumulative average value for the first j telecommunication interactions is presented.

Two individualized data structures are shown in greater detail. The first individualized data structure 201 corresponds to an agent-side participant who has completed 500 telecommunication interactions (N=500) and the second individualized data structure 202 corresponds to an agent-side participant who has completed 188 telecommunication interactions (N=188). For purposes of explanation, only the columns corresponding to agent sentiment, caller sentiment, and talk time are shown. Moreover, for purposes of explanation, each entry is scored on a five-point scale, where five indicates the highest score for a given variable and one indicates the lowest score for a given variable. In practical implementations, the entries may be numerically presented in any desired format (e.g., as a percentage, as a decimal normalized to 1, etc.).

In the first telecommunication interaction in which the first agent-side participant participated, the CSAT score was 2, the agent sentiment score was 2, the caller sentiment score was 2, and the talk time score was 3. In the second telecommunication interaction in which the first agent-side participant participated, the CSAT score was 3, the agent sentiment score was 2, the caller sentiment score was 4, and the talk time score was 4. Thus, the second row (j=2) of the first individualized data structure 201 includes 2.500 as the cumulative average for the CSAT score, 2.000 as the cumulative average for the agent sentiment score, 3.000 as the cumulative average for the customer sentiment score, and 3.500 as the cumulative average for the talk time score. In this case, after all telecommunication interactions in the database, it can be seen from the final row of the first individualized data structure (j=N=500) that the data has reached converge values of 3.375 for the CSAT score, 3.110 for the agent sentiment score, 3.644 for the caller sentiment score, and 3.986 for the talk time score.

For comparison, in the first telecommunication interaction in which the second agent-side participant participated, the CSAT score was 2, the agent sentiment score was 3, the caller sentiment score was 2, and the talk time score was 3. In the second telecommunication interaction in which the second agent-side participant participated, the CSAT score was 3, the agent sentiment score was 5, the caller sentiment score was 2, and the talk time score was 5. Thus, the second row (j=2) of the second individualized data structure 202 includes 2.500 as the cumulative average for the CSAT score, 4.000 as the cumulative average for the agent sentiment score, 2.000 as the cumulative average for the customer sentiment score, and 4.000 as the cumulative average for the talk time score. In this case, after all telecommunication interactions in the database, it can be seen from the final row of the first individualized data structure (j=N=188) that the data has reached converge values of 2.900 for the CSAT score, 4.338 for the agent sentiment score, 1.746 for the caller sentiment score, and 4.213 for the talk time score. Note that, because the second individualized data structure 202 includes fewer rows than the first individualized data structure 201, the converge values may be less stable.

The cumulative historical data 160 may be used to determine a CSAT mean state 171, to determine a driver variable state 172, and to build a machine learning model 173. The CSAT mean state 171 may correspond to the mean of the cumulative average values of the CSAT score for the most-recent call across all agent-side participants 101 (i.e., using the value in row N for each individualized data structure 201-2XX illustrated in FIG. 2). The driver variable state 172 may correspond to the mean of the cumulative average values of the CSAT drivers for the most-recent call across all agent-side participants 101 (i.e., using the value in row N for each individualized data structure 201-2XX illustrated in FIG. 2). The CSAT mean state 171 and/or the driver variable state 172 may be based on a weighted average of the individual agents, or may be a raw (unweighted) average. The machine learning model 173 may be built using cumulative average values of historical data for all agents. The machine learning model 173 may consider the CSAT score as a dependent variable and the various CSAT drivers as independent variables, and may be a regression-tree-based model trained using a randomized grid search. The machine learning model 173 may be validated using actual data from the agent-side participants 101.

These outputs may be input to an analysis device 180 which determines, for one or more agent-side participants, the participant's CSAT performance 181, CSAT performance direction 182, and potential lift 183. In so doing, the analysis device 180 (for example, using the machine learning model 173) may be configured to select a window of data from the cumulative historical data 160 and classify each agent as above average, neutral, or below average in terms of the CSAT performance 181; and strongly declining, declining, steady, improving, or strongly improving in terms of the CSAT performance direction 182. In one particular example, the analysis device 180 selects the fifty most-recent calls (i.e., from j=N−50 to j=N) for each agent-side participant 101. The classification may be performed according to a predetermined set of rules.

The analysis device 180 may identify intervention variables by receiving the driver variable state 172 and comparing the average value for each CSAT driver to the value for agents whose most-recent call performance was above the CSAT mean state 171. This may provide the potential improvement that could be achieved by under-performing agents if the corresponding CSAT driver is improved. The analysis device 180 may further identify intervention variables based on a determination as to whether the corresponding CSAT driver is within the agent's control, and may consider other variables to be "non-intervention" variables. For example, using the data illustrated in FIG. 2, it can be seen that, although the second agent-side participant has a lower converge value for CSAT score than the first agent-side participant, the second agent-side participant has performed better in the areas of agent sentiment, talk time, and so on. Thus, it may be the case that the second agent-side participant's lower score is due to factors that are outside of the agent's control, such as caller sentiment. The CSAT drivers which are controllable and which affect the CSAT score may be categorized as intervention variables. Note that it is not necessarily true that agent sentiment and talk time are intervention variables while caller sentiment is not, and this example is presented merely for purposes of explanation.

By analyzing the individualized data structure (and, in particular, the values for CSAT drivers corresponding to intervention variables) for those agent-side participants 101 who exhibit low CSAT scores, and by simulating the effects of improving the values for CSAT drivers corresponding to intervention variables, the analysis device 180 may calculate a potential lift 183. The CSAT performance 181, the CSAT performance direction 182, and the potential lift 183 may be used to generate a list of intervention-target agent-side participants 190. Other agent-side participants may be considered non-target agent-side participants, and no further action may be taken on said participants. The list of intervention-target agent-side participants 190 may be arranged in order of priority, for example, by arranging the agent-side participants 101 in order of decreasing potential lift 183. Thus, the list of intervention-target agent-side participants 190 does not necessarily correspond to the lowest-performing agents, but rather corresponds to the agents most likely to benefit from intervention.

Figure 3:
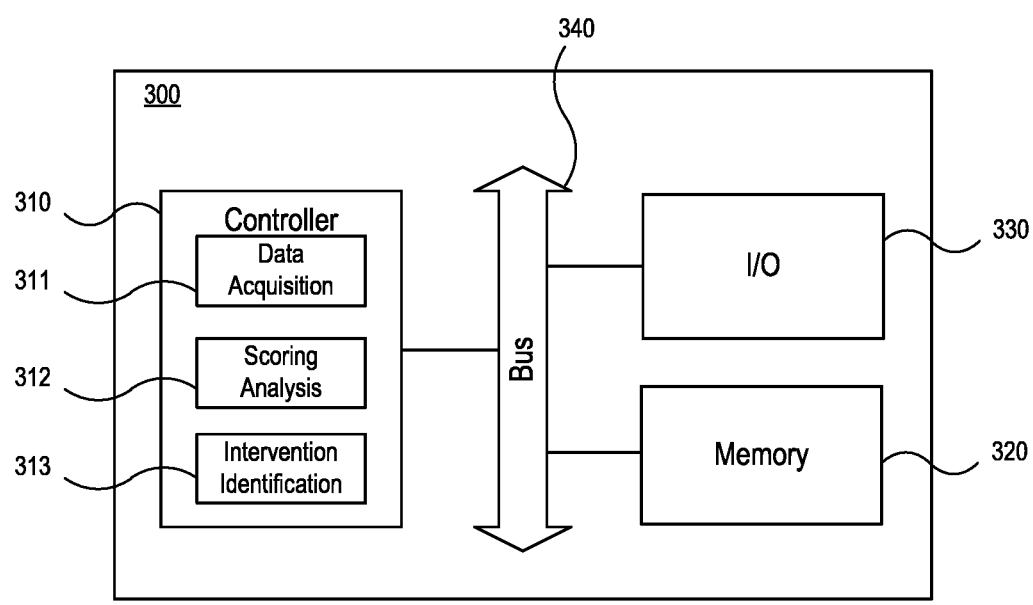
FIG. 3 illustrates an exemplary speech processing system according to various aspects of the present disclosure.

FIG. 3 illustrates an exemplary speech processing system 300, which may correspond in some examples to the analysis device 180. The speech processing system 300 includes an electronic processor 310, a memory 320, and input/output (I/O) circuitry 330, each of which communicate with one another via a bus 340. The processor 310 may be or include one or more microprocessors and/or one or more cores. In one implementation, the processor 310 is a central processing unit (CPU) of the speech processing system 300.

The processor 310 may include circuitry configured to perform certain operations. As illustrated, the processor includes a data acquisition unit 311, a scoring analysis unit 312, and an intervention identification unit 313. Each of the units 311-313 may be implemented via dedicated circuitry in the processor 310, via firmware, via software modules loaded from the memory 320, or combinations thereof. Collectively, the data acquisition unit 311, the scoring analysis unit 312, and the intervention identification unit 313 perform speech processing operations in accordance with the present disclosure. One example of such operations is described in detail here.

The data acquisition unit 311 is configured to perform operations of obtaining data. For example, the data acquisition unit 311 may obtain a trained machine learning model, wherein the machine learning model has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables. The data acquisition model may obtain a trained classification model, wherein the classification model has been trained using features extracted from the at least one digitally-encoded speech representation. In some examples, the machine learning model corresponds to the machine learning model 173 illustrated in FIG. 1, the cumulative historical data structure corresponds to at least a portion of the cumulative historical data 160 illustrated in FIG. 1 and/or to at least one of the individual data structures 2XX illustrated in FIG. 2, and/or the trained classification model corresponds to the classification model 140 illustrated in FIG. 1.

The scoring analysis unit 312 is configured to apply the trained machine learning model to various inputs to achieve various results. For example, the scoring analysis unit 312 may apply the trained machine learning model to a subset of data in the cumulative historical data structure that corresponds to a first agent-side participant of the plurality of agent-side participants, to generate at least one of a performance classification score or a performance direction classification score; to apply the trained machine learning model to identify an intervention-target agent-side participant from among the plurality of agent-side participants, and so on. The performance classification score may indicate a performance of the first agent-side participant relative to a plurality of second agent-side participants of the plurality of agent-side participants, and the performance direction classification score may indicate a current performance of the first agent-side participant relative to a previous performance of the first agent-side participant.

In some implementations, the scoring analysis unit 312 itself may be configured to generate the cumulative historical data structure. In such implementations, then, it may not be necessary for the data acquisition unit 311 to obtain the cumulative historical data structure but instead to obtain previously-scored call data and/or survey data (e.g., from the data store 120 illustrated in FIG. 1). Generating the cumulative historical data structure may include operations of obtaining a plurality of agent values corresponding to the plurality of agent-side participants, wherein the plurality of agent values include a plurality of driver values and a score value, and generating a plurality of two-dimensional data structures each corresponding to one of the plurality of agent-side participants, wherein a respective row of the two-dimensional data structure includes a plurality of entries respectively corresponding to a cumulative average value of one of the plurality of agent values.

The intervention identification unit 313 is configured to identify interventions and/or intervention training plans, for example by applying the trained machine learning model. This may include identifying an intervention-target two-dimensional data structure from among the cumulative historical data structure, wherein the intervention-target two-dimensional data structure corresponds to the intervention-target agent-side participant; and based on data corresponding to a plurality of intervention variables included in the intervention-target two-dimensional data structure, selecting the intervention training plan from among a plurality of candidate training plans.

In some implementations, the intervention identification unit 313 may be configured to conduct at least one training session for the intervention-target agent-side participant according to the intervention training plan. Additionally or alternatively, the intervention identification unit 313 may be configured to recommend the at least one training session, which may then be performed by another device or a human intervenor.

The memory 320 may be any computer-readable storage medium (e.g., a non-transitory computer-readable medium), including but not limited to a hard disk, a Universal Serial Bus (USB) drive, a removable optical medium (e.g., a digital versatile disc (DVD), a compact disc (CD), etc.), a removable magnetic medium (e.g., a disk, a storage tape, etc.), and the like, and combinations thereof. The memory 320 may include non-volatile memory, such as flash memory, read-only memory (ROM), erasable programmable read-only memory (EPROM), electrically erasable programmable read-only memory (EEPROM), a solid-state device (SSD), and the like; and/or volatile memory, such as random access memory (RAM), dynamic RAM (DRAM), double data rate synchronous DRAM (DDRAM), static RAM (SRAM), and the like. The memory 320 may store instructions that, when executed by the processor 210, cause the processor 310 to perform various operations, including those disclosed herein.

The I/O circuitry 330 may include circuitry and interface components to provide input to and output from the speech processing system 300. The I/O circuitry 330 may include communication circuitry to provide communication with devices external to or separate from the speech processing system 300. The communication circuitry may be or include wired communication circuitry (e.g., for communication via electrical signals on a wire, optical signals on a fiber, and so on) or wireless communication circuitry (e.g., for communication via electromagnetic signals in free space, optical signals in free space, and so on). The communication circuitry may be configured to communicate using one or more communication protocols, such as Ethernet, Wi-Fi, Li-Fi, Bluetooth, ZigBee, WiMAX, Universal Mobile Telecommunications System (UMTS or 3G), Long Term Evolution (LTE or 4G), New Radio (NR or 5G), and so on.

The I/O circuitry 330 may further include user interface (UI) circuitry and interface components to provide interaction with a user. For example, the UI may include visual output devices such as a display (e.g., a liquid crystal display (LCD), and organic light-emitting display (OLED), a thin-film transistor (TFT) display, etc.), a light source (e.g., an indicator light-emitting diode (LED), etc.), and the like; and/or audio output devices such as a speaker. The UI may additionally or alternatively include visual input devices such as a camera; audio input devices such as a microphone; and physical input devices such as a button, a touchscreen, a keypad or keyboard, and the like. In some implementations, the I/O circuitry 330 itself may not include the input or output devices, but may instead include interfaces or ports configured to provide a connection external devices implementing some or all of the above-noted inputs and outputs. These interfaces or ports may include Universal Serial Bus (USB) ports, High-Definition Multimedia Interface (HDMI) ports, Mobile High-Definition Link (MDL) ports, FireWire ports, DisplayPort ports, Thunderbolt ports, and the like.

The I/O circuitry 330 may be used to output various data structures, including but not limited to raw data, predicted satisfaction classifications, algorithm analysis scores (e.g., precision, recall, accuracy, etc.), and so on. These data structures may be output to an external device which may itself include a display to display the data structures to a user, a memory to store the data structures, and so on. Additionally or alternatively, these data structures may be displayed or stored by or in the speech processing system 300 itself.

Figure 4:
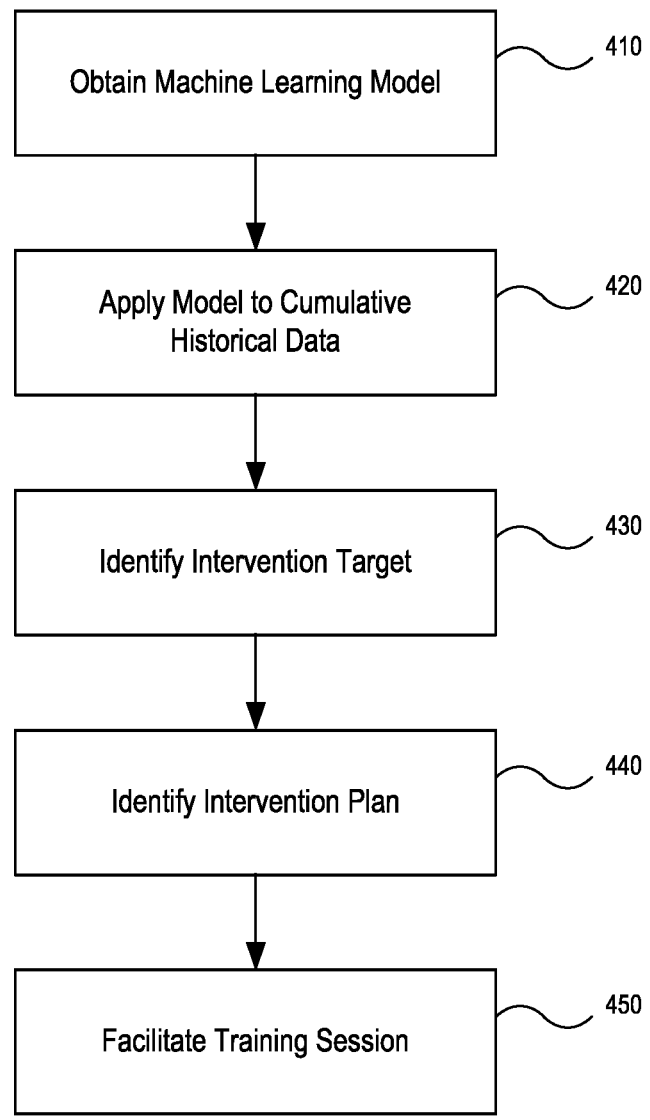
FIG. 4 illustrates an exemplary processing method according to various aspects of the present disclosure.

FIG. 4 illustrates an exemplary process flow for processing speech in telecommunication interactions, in accordance with the present disclosure. The process flow of FIG. 4 may be performed by the speech processing system 300 described above and/or by other processing systems.

The process flow beings with data acquisition at operation 410. Operation 410 includes obtaining a machine learning model, such as a trained machine learning model that has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables. Operation 410 may also include obtaining a classification model, such as a trained classification model that has been trained using features extracted from the at least one digitally-encoded speech representation. In some examples, the machine learning model corresponds to the machine learning model 173 illustrated in FIG. 1, the cumulative historical data structure corresponds to at least a portion of the cumulative historical data 160 illustrated in FIG. 1 and/or to at least one of the individual data structures 2XX illustrated in FIG. 2, and/or the trained classification model corresponds to the classification model 140 illustrated in FIG. 1. Where operation 410 includes multiple acquisitions (e.g., where both the machine learning model and the classification model are obtained), the acquisitions may be performed in any order. Moreover, in such instances the different models and/or data may obtained from the same or different sources.

While not particularly illustrated in FIG. 4, the data acquisition of operation 410 may include data generation. For example, operation 410 may include operations of generating the cumulative historical data structure, in which case it may not be necessary to obtain the cumulative historical data structure from an external data store. Generating the cumulative historical data structure may include operations of obtaining a plurality of agent values corresponding to the plurality of agent-side participants, wherein the plurality of agent values include a plurality of driver values and a score value, and generating a plurality of two-dimensional data structures each corresponding to one of the plurality of agent-side participants, wherein a respective row of the two-dimensional data structure includes a plurality of entries respectively corresponding to a cumulative average value of one of the plurality of agent values.

After data acquisition, the exemplary process flow includes applying the acquired model to the cumulative historical data structure at operation 420. Operation 420 may include applying the trained machine learning model to a subset of data in the cumulative historical data structure that corresponds to a first agent-side participant of the plurality of agent-side participants, to generate at least one of a performance classification score or a performance direction classification score; applying the trained machine learning model to identify an intervention-target agent-side participant from among the plurality of agent-side participants, and so on. The performance classification score may indicate a performance of the first agent-side participant relative to a plurality of second agent-side participants of the plurality of agent-side participants, and the performance direction classification score may indicate a current performance of the first agent-side participant relative to a previous performance of the first agent-side participant.

Thereafter, at operation 430 the process flow includes identifying an intervention target. Operation 430 may be performed by applying the machine learning model obtained in operation 410. Operation 430 may include identifying an intervention-target two-dimensional data structure from among the cumulative historical data structure, wherein the intervention-target two-dimensional data structure corresponds to the intervention-target agent-side participant. Operation 430 is not limited to selecting a single intervention-target agent-side participant, and instead may include selecting any number of intervention-target agent-side participants (or may be repeated any number of times). After one or more intervention-target agent-side participants have been selected, at operation 440 the process flow includes identifying an intervention training plan. Operation 440 may include, based on data corresponding to a plurality of intervention variables included in the intervention-target two-dimensional data structure, selecting the intervention training plan from among a plurality of candidate training plans. Operation 440 may include selecting a plan individually-tailored to each intervention-target agent-side participant or may be repeated a number of times corresponding to the total number of intervention-target agent-side participants.

In some implementations, the process flow may include operation 450 of facilitating, recommending, or conducting one or more training sessions in accordance with the selected intervention training plan(s). The intervention training plan(s) may be conducted in an automated manner and/or by a human intervenor.

The exemplary systems and methods described herein may be performed under the control of a processing system executing computer-readable codes embodied on a non-transitory computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for processing speech, the method comprising:
   obtaining a trained machine learning model, wherein the machine learning model has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables;
   determining a driver variable state as a function of the cumulative historical data structure;
   applying the trained machine learning model to a subset of data in the cumulative historical data structure that corresponds to a first agent-side participant of the plurality of agent-side participants, to generate at least one of a performance classification score or a performance direction classification score;
   applying the trained machine learning model to identify an intervention-target agent-side participant from among the plurality of agent-side participants;
   applying the trained machine learning model to the cumulative historical data structure to identify an intervention training plan, wherein identifying the intervention training plan comprises identifying one or more intervention variables for the intervention-target agent-side participant based on the driver variable state; and
   conducting at least one training session for the intervention-target agent-side participant according to the intervention training plan.

2. The method according to claim 1, wherein the performance classification score indicates a performance of the first agent-side participant relative to a plurality of second agent-side participants of the plurality of agent-side participants, and the performance direction classification score indicates a current performance of the first agent-side participant relative to a previous performance of the first agent-side participant.

3. The method according to claim 1, wherein identifying the intervention-target agent-side participant includes:
   applying the trained machine learning model for each of the plurality of agent-side participants, to calculate a potential lift value using potential values for at least one of the plurality of driver variables; and
   based on the potential lift value, classifying each of the plurality of agent-side participants as the intervention-target agent-side participant or a non-target agent-side participant.

4. The method according to claim 1, wherein identifying the intervention training plan includes:
   identifying an intervention-target two-dimensional data structure from among the cumulative historical data structure, wherein the intervention-target two-dimensional data structure corresponds to the intervention-target agent-side participant; and
   based on data corresponding to a plurality of intervention variables included in the intervention-target two-dimensional data structure, selecting the intervention training plan from among a plurality of candidate training plans.

5. The method according to claim 1, further comprising:
   generating the cumulative historical data structure, including:
      obtaining a plurality of agent values corresponding to the plurality of agent-side participants, wherein the plurality of agent values include a plurality of driver values and a score value, and
      generating a plurality of two-dimensional data structures each corresponding to one of the plurality of agent-side participants, wherein a respective row of the two-dimensional data structure includes a plurality of entries respectively corresponding to a cumulative average value of one of the plurality of agent values; and
   training the machine learning model by applying an algorithm to the plurality of two-dimensional data structures, wherein the algorithm is configured to treat the score value as a dependent variable and to treat each of the plurality of driver values as an independent variable.

6. The method according to claim 1, wherein the cumulative historical data structure includes a plurality of two-dimensional data structures, wherein respective ones of the plurality of two-dimensional data structures correspond to respective ones of the plurality of agent-side participants.

7. The method according to claim 6, wherein:
   a respective two-dimensional data structure includes N rows, where N is a total number of telecommunication interactions conducted by a corresponding agent-side participant;
   a j-th row of the respective two-dimensional data structure corresponds to a cumulative average value for the first j telecommunication interactions conducted by the corresponding agent-side participant; and
   the respective two-dimensional data structure includes a score column containing values of the score variable, and a plurality of driver columns containing values of the plurality of driver variables.

8. The method according to claim 1, wherein the at least one digitally-encoded speech representation includes digitally-encoded data corresponding to at least one of a recording or a transcript of a telecommunications interaction.

9. The method according to claim 1, wherein identifying the intervention training plan further comprises identifying non-intervention variables.

10. The method according to claim 1, further comprising:
    obtaining a trained classification model, wherein the classification model has been trained using features extracted from the at least one digitally-encoded speech representation; and
    using the trained classification model, identifying the plurality of driver variables from among a plurality of variables included in the digitally-encoded speech representation.

11. A computing system for processing speech, the system comprising:
    at least one electronic processor; and
    a non-transitory computer readable medium storing instructions that, when executed by the at least one electronic processor, cause the electronic processor to perform operations comprising:
       obtaining a trained machine learning model, wherein the machine learning model has been trained using a cumulative historical data structure corresponding to at least one digitally-encoded speech representation for a plurality of telecommunications interactions conducted by a plurality of agent-side participants, wherein the cumulative historical data structure includes a first data corresponding to a score variable and a second data corresponding to a plurality of driver variables, determining a driver variable state as a function of the cumulative historical data structure, applying the trained machine learning model to a subset of data in the cumulative historical data structure that corresponds to a first agent-side participant of the plurality of agent-side participants, to generate at least one of a performance classification score or a performance direction classification score, applying the trained machine learning model to identify an intervention-target agent-side participant from among the plurality of agent-side participants, applying the trained machine learning model to the cumulative historical data structure to identify an intervention training plan, wherein identifying the intervention training plan comprises identifying one or more intervention variables for the intervention-target agent-side participant based on the driver variable state, and facilitating at least one training session for the intervention-target agent-side participant according to the intervention training plan.

12. The system according to claim 11, wherein the performance classification score indicates a performance of the first agent-side participant relative to a plurality of second agent-side participants of the plurality of agent-side participants, and the performance direction classification score indicates a current performance of the first agent-side participant relative to a previous performance of the first agent-side participant.

13. The system according to claim 11, wherein identifying the intervention-target agent-side participant includes:

applying the trained machine learning model for each of the plurality of agent-side participants, to calculate a potential lift value using potential values for at least one of the plurality of driver variables; and based on the potential lift value, classifying each of the plurality of agent-side participants as the intervention-target agent-side participant or a non-target agent-side participant.

14. The system according to claim 11, wherein identifying the intervention training plan includes:

identifying an intervention-target two-dimensional data structure from among the cumulative historical data structure, wherein the intervention-target two-dimensional data structure corresponds to the intervention-target agent-side participant; and based on data corresponding to a plurality of intervention variables included in the intervention-target two-dimensional data structure, selecting the intervention training plan from among a plurality of candidate training plans.

15. The system according to claim 11, the operations further comprising:

generating the cumulative historical data structure, including:

obtaining a plurality of agent values corresponding to the plurality of agent-side participants, wherein the plurality of agent values include a plurality of driver values and a score value, and generating a plurality of two-dimensional data structures each corresponding to one of the plurality of agent-side participants, wherein a respective row of the two-dimensional data structure includes a plurality of entries respectively corresponding to a cumulative average value of one of the plurality of agent values; and training the machine learning model by applying an algorithm to the plurality of two-dimensional data structures, wherein the algorithm is configured to treat the score value as a dependent variable and to treat each of the plurality of driver values as an independent variable.

16. The system according to claim 11, wherein the cumulative historical data structure includes a plurality of two-dimensional data structures, wherein respective ones of the plurality of two-dimensional data structures correspond to respective ones of the plurality of agent-side participants.

17. The system according to claim 16, wherein:

a respective two-dimensional data structure includes N rows, where N is a total number of telecommunication interactions conducted by a corresponding agent-side participant;

a j-th row of the respective two-dimensional data structure corresponds to a cumulative average value for the first j telecommunication interactions conducted by the corresponding agent-side participant; and the respective two-dimensional data structure includes a score column containing values of the score variable, and a plurality of driver columns containing values of the plurality of driver variables.

18. The system according to claim 11, wherein the at least one digitally-encoded speech representation includes digitally-encoded data corresponding to at least one of a recording or a transcript of a telecommunications interaction.

19. The system according to claim 11, wherein identifying the intervention training plan further comprises identifying non-intervention variables.

20. The system according to claim 11, the operations further comprising:

obtaining a trained classification model, wherein the classification model has been trained using features extracted from the at least one digitally-encoded speech representation; and using the trained classification model, identifying the plurality of driver variables from among a plurality of variables included in the digitally-encoded speech representation.

* * * * *